United States Patent
Lapidous et al.

(10) Patent No.: US 6,285,779 B1
(45) Date of Patent: Sep. 4, 2001

(54) FLOATING-POINT COMPLEMENTARY DEPTH BUFFER

(75) Inventors: Eugene Lapidous, Santa Clara; Guofang Jiao, San Jose, both of CA (US)

(73) Assignee: Trident Microsystems, Santa Clara, CA (US)

(*) Notice: Subject to any disclaimer, the term of this patent is extended or adjusted under 35 U.S.C. 154(b) by 0 days.

(21) Appl. No.: 09/365,685

(22) Filed: Aug. 2, 1999

(51) Int. Cl.⁷ .................................................. G06K 9/00
(52) U.S. Cl. ................................ 382/106; 345/422
(58) Field of Search .................................. 382/106, 154; 345/419, 421, 422

(56) References Cited

U.S. PATENT DOCUMENTS

| | | | |
|---|---|---|---|
| 5,301,263 | 4/1994 | Dowdell | 395/122 |
| 5,359,704 | 10/1994 | Rossignac et al. | 395/122 |
| 5,542,032 | * 7/1996 | Pritt | 395/121 |
| 5,748,863 | 5/1998 | Fossum | 395/122 |
| 5,808,618 | 9/1998 | Kawano et al. | 345/422 |
| 5,819,017 | * 10/1998 | Akeley et al. | 395/122 |
| 5,856,829 | 1/1999 | Gray, III et al. | 345/422 |
| 6,046,746 | * 4/2000 | Deering | 345/422 |
| 6,115,047 | * 9/2000 | Deering | 345/422 |

OTHER PUBLICATIONS

3D Computer Graphics, Second Edition; pp 70–74; Watt; Addison–Wesley Publishing Company, (No Date).
Computer Graphics Principles and Practice, Second Edition; pp 268–278; Foley et al; Addison Wesley Publishing Company (No Date).
Gary Tarolli on 32 bit vs. 16bit color; 3dfx Appendix on Z–Buffer; http://222.3dfx.com, printed Apr. 12, 1999.
What Are Depth Buffers?; mk:@MSITStore:C, printed Mar. 24, 1999.

* cited by examiner

Primary Examiner—Andrew W. Johns
(74) Attorney, Agent, or Firm—Gray Cary Ware & Freidenrich

(57) ABSTRACT

A method for evaluating the depth of a pixel in a scene, the scene enclosed in a view volume, the scene to be rendered from a camera position, the view volume having a near and a far plane, includes calculating a depth value for a pixel in the scene, the depth value being generated by a depth function of view distance within the view volume from the camera position, and storing the depth value in a floating-point format, the floating-point format including a mantissa and exponent, where, as the distance of the pixel to the far plane decreases, the absolute magnitude of the depth value generated by the depth function approaches the minimum non-negative number representable by the floating-point format.

22 Claims, 14 Drawing Sheets

16-bit fixed-point inverse W buffer 16-bit 4.12 floating-point inverse W buffer

16-bit 4.12 floating-point complimentary Z buffer

16-bit complimentary Z buffer

FLOATING-POINT COMPLEMENTARY DEPTH BUFFER

BACKGROUND

The invention relates generally to digital image processing and display of digitally rendered images.

Rendering of three-dimensional scenes typically requires realistic representation of multiple objects in the field of view. The distance of each object from the point of view (also known in 3D graphics as camera position) can determine whether the object blocks (occludes) or is blocked by other objects in the scene. Even in the case of a single object, some of its parts may block or be blocked by other parts depending upon each part's distance from the point of view. Methods and apparatus used to resolve occlusions and eliminate hidden surfaces play an important role in the creation of realistic images of three-dimensional scenes.

To work effectively, hidden surface elimination methods should have a depth resolution better than the minimal distance between the occluding object and the occluded object in the scene. Such a method should also be simple enough to be implemented in conventional low-cost graphics hardware that accelerates three-dimensional rendering, or in conventional software-only graphics renderers when a hardware accelerator is not available.

Many popular algorithms for hidden surface elimination utilize a special depth buffer, also known as a Z-buffer. Each new pixel at two-dimensional location X, Y on the screen is associated with depth value Z. This value is compared with a depth value stored in the depth buffer at the location corresponding to the same X, Y coordinate. A visibility test compares the new and stored depth values; if the visibility test passes, meaning the new object is closer and therefore blocks the portion of the prior object at the same coordinates, then the depth value in the depth buffer is updated.

Where objects in the scene are rendered as a collection of triangularly shaped surfaces, values of X, Y and Z are computed for each vertex of each triangle by transforming three-dimensional vertex coordinates from the view space (a regular three-dimensional space having an origin of the coordinates aligned with the camera position) to a screen space (a three-dimensional space with the X-Y plane parallel to the screen, but distorted as a result of perspective projection). During this transformation the actual depth of the object in the camera field of view Zv is mapped to the depth Zs in the screen space.

After values Zs are computed for every vertex of a triangle, they are linearly interpolated for every pixel of the surface defined by the triangle during triangle rasterization. Then, interpolation results for each pixel are compared with the Zs values stored in the Z-buffer at the corresponding location to test the visibility of the current pixel. If the current pixel is located behind the current Zs value (i.e., the distance from the camera represented by Zs interpolated for the current pixel is greater than the distance from the camera represented by Zs stored in the depth buffer at the same coordinates X,Y), the pixel is not visible and will not be displayed.

Here a pixel is defined as a set of parameters representing an area of the object's surface which correspond to a point of the raster grid associated with the screen coordinate space. These parameters can include the two-dimensional coordinates of the point in the raster grid, as well as its color and depth values which correspond to the locations for the area as stored in a color buffer and in a depth buffer. A pixel is visible if its color and depth values are stored at the corresponding locations in the color buffer and in the depth buffer after scene rendering is completed. A pixel is invisible if its parameters are overwritten by another pixel having a depth value corresponding to the smaller distance from the camera.

The mapping between Zv and Zs is non-linear because of the non-linear nature of a perspective projection. However, this mapping should satisfy certain constraints to avoid gross errors during linear interpolation and to fully utilize the precision of a Z-buffer.

First, to avoid errors during linear interpolation, lines and planes in the view space have to be transformed into lines and planes in the screen space. Second, to maximize precision of the Z-buffer, depth values Zs in the screen space should vary from the smallest to largest of the values that can be stored in the Z-buffer. Usually, the range between maximal and minimal values that can be stored in the Z-buffer is mapped to the interval [0,1]; in this case, Z is typically normalized to [0,1] range. An additional constraint, which supports an intuitive notion of depth, is that a point further from the camera in the view space (larger Zv) also has a larger depth in the screen space (larger Zs). As shown by Newman, W. M and Sproull, R. F. (Principles of Interactive Computer Graphics, 1981, McGraw-Hill New York), these conditions are satisfied by following relation between Zv and Zs:

$$Zs = \frac{f}{f-d} * \left(1 - \frac{d}{Zv}\right) \quad [1]$$

where f and d are, correspondingly, distances from the camera to the far and near clipping planes bounding the view volume in the screen space.

Equation [1] is widely used in computer graphics to compute depth in the screen space, store results in the depth buffer and evaluate visibility of rendered surfaces. However, the equation suffers from the disadvantage that it is a non-linear mapping between Zv and Zs. This makes Zs less sensitive to changes in Zv which are close to the far end of the view volume as compared with changes in Zv which are close to the near end of the view volume.

For instance, if the ratio of distances between the far and near planes equals 100, a small change in Zv close to the near plane causes a 10,000 times larger change in Zs than the same amount of change in Zv close to the far plane.

A ratio of distances between the far and near planes in excess of 100 is typical for three-dimensional applications that render large open spaces. For example, a flight simulator graphical program may have a range of visual distances from 0.1 mile for the closest point on the ground to a 10-mile distance for the mountains near the horizon. If the total resolution of the depth buffer is 16 bits (yielding a Zs range from 0 to 65535), a minimum change from Zs=0 to Zs=1 (close to the camera) corresponds to a change in the object's distance of 0.95 inches, while a change of Zs from Zs=65534 to Zs=65535 (far from the camera) corresponds to a change in the object's distance of 797 feet.

Large ratios of distances to the far and near planes are also found in applications that render closed interior spaces, especially if such interiors include sets of mirrors with interdependent reflections.

As a result, applications that have a high ratio of distances between the far and near planes typically encounter errors when attempting to eliminate hidden surfaces distant from the camera. These errors can be experienced as, e.g., mountains or buildings randomly appearing in front of each other. Application developers have sometimes attempted to solve this problem by blending far regions of the scene with fog color, effectively decreasing visible range.

In some cases, this solution is satisfactory and provides good depth buffer resolution in the areas close to the viewer; however, in other instances blending of distant objects with fog can detract from the realism of the scene. It is often more desirable to provide high resolution throughout the view volume, whether close or far from the camera.

One method for improving resolution of the depth buffer is to directly store the distance from the camera in fixed-point format (this solution is also known as a W-buffer, in reference to the parameter 1/W, supplied per each vertex for perspective-correct texture mapping and usually proportional to 1/Zv). To produce correct results, 1/W has to be interpolated for each pixel with a subsequent high-precision computation of the reciprocal value. These high-precision per-pixel operations make hardware implementations more difficult; generally, the implementations of this method are limited to software.

To decrease the complexity of hardware implementation, one method described in the U.S. Pat. No. 5,856,829 stores depth as an inverse distance to the camera (1/Zv or 1/W), without computing a high-precision Zv or W for each pixel. While this solution may increase precision in comparison with a standard Z-buffer, it does not typically utilize the full range of depth buffer values and may create incorrect visual artifacts for scenes with distances close to near and far planes. Another method for improving resolution of a depth buffer employs per-pixel reformatting operations on the Z value after interpolation, such as by using a square root or logarithm function (as shown in U.S. Pat. No. 5,808,618), or by using a block-fixed format (as described in U.S. Pat. No. 5,856,829). In both cases, such per-pixel operations can increase hardware cost and can degrade performance during critical stages of the rendering pipeline. One more difficulty with such conversions into special formats is that the stored value becomes harder to interpret by an application seeking to directly access the depth buffer (for instance, to identify an object stored at a current location by its depth). Also, block-fixed formats can cause sharp precision changes at the boundaries of fixed-format ranges, which may cause undesirable image artifacts.

Another way to increase resolution of the depth buffer includes storing a floating-point value of the depth instead of a fixed-point value. The floating-point value is stored as a combination of exponent and mantissa (with an optional sign bit, if the value can be negative). Floating-point storage improves effective resolution of the inverse W-buffer; however, this improvement is limited by the fact that the inverse W-buffer does not cover the entire available storage range, especially since it excludes from the representation of depth the smallest floating-point values having a rapidly changing exponent. Incomplete compensation of non-linear decrease of depth resolution for small 1/W values can make the precision of an inverse W-buffer significantly lower than that of a fixed-point W-buffer for the same per-pixel storage size.

Another disadvantage common to both W-buffer and inverse W-buffers is that they require depth values Zv linearly proportional to the distance from the camera for every vertex. 3D rendering APIs, such as OpenGL or Direct3D, do not require a graphics application to provide a parameter proportional to Zv if the application performs coordinate transformation to the screen space by itself. Thus, a graphics application can omit parameter W, for instance if it does not require perspective-correct texture mapping, or can use a non-linear W in relation to Zv, as in case of projected textures. Therefore, both W-buffer and inverse W-buffer methods can only be used generally in a subset of 3D rendering applications and cannot be considered universal solutions.

SUMMARY

In general, in once aspect, the invention features a method for evaluating the depth of a pixel in a scene, the scene enclosed in a view volume, the scene to be rendered from a camera position, the view volume having a near and a far plane, including calculating a depth value for a pixel in the scene, the depth value being generated by a depth function of view distance within the view volume from the camera position, and storing the depth value in a floating-point format, the floating-point format including a mantissa and exponent, where, as the distance of the pixel to the far plane decreases, the absolute magnitude of the depth value generated by the depth function approaches the minimum non-negative number representable by the floating-point format.

Embodiments of the invention may include one or more of the following features. For a pixel within the view volume having the minimal non-zero distance to the far plane represented by a unique stored depth value, the depth value can be stored as the smallest positive floating-point number representable by the floating-point format. For a pixel at the far plane, the depth value can be stored as 0 in the floating-point representation. For a pixel within the view volume having the minimal non-zero distance to the near plane represented by a unique stored depth value, the depth value can be stored as the second largest floating-point number representable by the floating-point format. For a pixel at the near plane, the depth value can be stored as the largest floating-point number representable by the floating-point format.

The depth function can generate depth values whose values or magnitudes decrease with increasing distance from the camera in the view volume. A new depth value can be calculated for a new pixel in the scene, the new pixel corresponding to a same location on a raster grid as the pixel, the new depth value being generated by the depth function, and the new depth value for the new pixel can be compared with a stored depth value for the pixel. The comparing step can further include determining whether the new depth value is greater, equal to, or less than the stored depth value for the pixel, and depending upon whether it is greater, equal to, or less than the stored depth value, indicating that the new pixel is visible or invisible.

The depth function, represented by Zs, can be:

$$Zs = \frac{d}{f-d} * \left(\frac{f}{Zv} - A\right)$$

where d is the distance to a near plane of the view volume, f is the distance to a far plane of the view volume, Zv is the distance to a particular pixel in the view volume, and A is a constant. A can be equal to 1.

In general, in another aspect, the invention features a method for evaluating the depth of a pixel in a scene, the scene enclosed in a view volume, the scene to be rendered from a camera position, the view volume having a near and a far plane, including calculating a depth value for a pixel in the scene, the depth value being generated by a depth function of view distance within the view volume from the camera position, and storing the depth value in a floating-point format, the floating-point format including a mantissa and exponent, where substantially the entire set of points of view distance, from the near to the far plane in the view volume, is mapped by the depth function to substantially the entire set of floating-point numbers representable in the floating-point format.

Embodiments of the invention may include one or more of the following features. A pixel located at the near plane can be mapped to the floating-point number with the maximum absolute magnitude representable in the floating-point format and a pixel located at the far plane can be mapped to the floating-point number with the minimum absolute magnitude representable in the floating-point format. The pixel located at the near plane can be mapped to the largest positive or to the largest negative floating-point value representable in the floating-point format and the pixel located at the far plane can be mapped to 0 in the floating-point format. The pixel parameters can be derived from one or more polygons having vertices. The depth value for the pixel can be generated by transforming vertex coordinates of a polygon of the object using the depth function and then interpolating one or more vertex coordinates of the object in the screen space to determine the depth value of the pixel. The depth function can compute the depth value by subtracting a depth value interpolated per pixel from a constant value. The constant value can be equal to the maximum depth value that can be stored in the floating-point format. The depth function can compute the depth value by subtracting a constant value from the reciprocal of the homogeneous coordinate W of the view distance corresponding to the pixel. The constant value can be equal to the reciprocal of the homogenous coordinate W corresponding to the view distance from the camera to the far plane. The depth function can compute the depth value by multiplying the homogeneous coordinate W of the view distance corresponding to the pixel by a scale factor, and subtracting a constant value. The constant value and scale factor can be selected such that the depth function generates, for the near and far planes respectively, depth values that have, respectively, the maximum and minimum absolute magnitude that can be represented by the floating point format.

In general, in another aspect, the invention features a method for evaluating the depth of a pixel in a scene, the scene enclosed in a view volume, the scene to be rendered from a camera position, the view volume having a near and a far plane, the method including calculating one or more depth values for pixels in the scene, the depth values being generated by a piece-wise continuous function of distance within the view volume from the camera position, and storing the depth values as floating-point numbers in a depth buffer using a floating-point format, such that for at least one pixel inside the view volume at which the derivative of the depth value function over the distance within the view volume has the smallest absolute magnitude over the view volume, its depth value is stored using a floating-point number having the smallest absolute magnitude representable in the floating-point format.

In general, in another aspect, the invention features a method for visibility testing of pixels rendered during rasterization of a scene in a sequence of scenes, each scene consisting of objects having points represented by coordinates in a view volume, the scene to be rendered from a camera position into a screen space having an associated raster grid, the view volume having a near and a far plane, the method including generating depth values for at least one pixel of an object using a depth function, and comparing the generated depth value with a depth value stored in a depth buffer for the same location on the raster grid, where said stored depth value represents distance to the location from the camera, where the stored depth values for a location on the raster grid, with respect to two different scenes, are stored in at least two different numerical formats having the same number of bits per pixel, respectively.

Embodiments of the invention may include one or more of the following features. At least one of the numerical formats can be a floating-point representation including a mantissa and an exponent. The at least two different numerical formats can be floating-point formats having the same total number of bits but with different numbers of bits for exponent and mantissa. The number of bits for exponent and mantissa for the depth values for a scene can be selected based upon one or more known parameters of the scene. One of the known parameters of the scene can be the ratio of distances from the camera of the far and near planes. One of the known parameters of the scene can be a distribution of the distances from the camera to the surfaces of the objects in the scene. One of the known parameters of the scene can be the location of an area of interest inside the view volume. The size of the exponent used for a scene with a larger ratio of distances to the far and near planes can be larger than for a scene with a smaller ratio of distances to the far and near planes, both scenes having substantially the same distribution of the distances from the camera to the surfaces of the objects in the scene. The size of the exponent used for a scene with an area of interest more distant from the camera can be larger than for a scene with an area of interest less distant from the camera, both scenes having substantially the same ratio of the distances to the far and near planes.

In general, in another aspect, the invention features a method for visibility testing of pixels rendered during rasterization of a scene in a sequence of scenes, each scene consisting of objects having points represented by coordinates in a view volume, the scene to be rendered from a camera position into a screen space having an associated raster grid, the view volume having a near and a far plane, the method including generating depth values for at least one pixel corresponding to a point in the view volume using a depth function, and comparing the generated depth value with a depth value stored in a depth buffer for the same location on the raster grid, where said stored depth value represents distance from the camera to the point in the view volume, where depth values for the same location on the raster grid for the same scene can be stored using at least two selectable different modes of operation, the two selectable modes of operation generating different stored depth values for the same distance from the camera to the point in the view volume to and for the same distances from the camera to the near and far planes in the view volume.

Embodiments of the invention may include one or more of the following features. The at least two selectable different modes of operation can be at least two different functions for mapping view distance of the pixel from the camera to the stored depth value. A selection between the at least two different functions can include switching between two different matrices that transform pixel coordinates from the view space to the screen space. During each mode of operation the depth value of the vertex can be generated by transforming coordinates of the vertex to screen space, the transformation producing positive preliminary depth values that increase with increase of distance to the camera, where for a first mode of operation the preliminary depth value of the vertex is modified such that the absolute value of the result of the first mode of operation decreases with an increase of the distance to the camera, while for a second mode of operation the resulting depth value of the vertex is substantially unchanged from the preliminary depth value. During each mode of operation the depth value of a pixel can be generated by transforming vertex coordinates of the object to screen space, the transformation producing positive depth values that increase with increase of distance to the camera and by interpolating per-vertex depth values to determine a preliminary depth value of the pixel, where for a first mode of operation the preliminary depth value of the pixel is modified such that the absolute value of the result of the first mode of operation decreases with an increase of the distance to the camera, while for a second mode of operation the depth of a vertex is substantially unchanged from the preliminary depth value.

In general, in another aspect, the invention features apparatus for evaluating the depth of a pixel in a scene, the scene enclosed in a view volume, the scene to be rendered from a camera position, the view volume having a near and a far plane, including a depth value calculation module configured to calculate a depth value for a pixel in the scene, the depth value being generated by a depth function of view distance within the view volume from the camera position, and a depth storage module configured to store the depth value in a depth value storage buffer using a floating-point format, the floating-point format including a mantissa and exponent, the depth value calculation module configured to calculate the depth value for the pixel such that, as the distance of the pixel to the far plane decreases, the absolute magnitude of the depth value generated by the depth function approaches the minimum non-negative number representable by the floating-point format of the depth value storage buffer.

In general, in another aspect, the invention features apparatus for visibility testing of pixels rendered during rasterization of a scene in a sequence of scenes, each scene consisting of objects having points represented by coordinates in a view volume, the scene to be rendered from a camera position into a screen space having an associated raster grid, the view volume having a near and a far plane, including a depth value calculation module configured to generate depth values for at least one pixel of an object using a depth function, and a visibility test module configured to compare the generated depth value with a depth value stored in a depth value storage buffer for the same location on the raster grid, where said stored depth value represents distance to the location from the camera, where the stored depth values for a location on the raster grid, with respect to two different scenes, are stored in at least two different numerical formats having the same number of bits per pixel, respectively.

In general, in another aspect, the invention features apparatus for visibility testing of pixels rendered during rasterization of a scene in a sequence of scenes, each scene consisting of objects having points represented by coordinates in a view volume, the scene to be rendered from a camera position into a screen space having an associated raster grid, the view volume having a near and a far plane, including a depth value calculation module configured to generate depth values for at least one pixel corresponding to a point in the view volume using a depth function, and a visibility test module configured to compare the generated depth value with a depth value stored in a depth value storage buffer for the same location on the raster grid, where said stored depth value represents distance from the camera to the point in the view volume, where depth values for the same location on the raster grid for the same scene can be stored using at least two selectable different modes of operation, said functions producing different stored depth values for the same distance of the point in the view volume from the camera and same distances of the far and near planes of the view volume from the camera.

Advantages of the invention may include one or more of the following. Depth resolution of objects located close to the far plane of the view volume can be increased. The maximal ratio between distances to the far plane and to the near plane of the view volume corresponding to pre-determined depth resolution of objects in the view volume can also be increased. The dependency of the depth resolution on the ratio between distances to the far plane and to the near plane of the view volume can be decreased. Also, the dependency of the depth resolution on the position of the object inside the view volume can be decreased. Further, depth resolution can be improved without requiring additional per-pixel operations that can slow down rendering or increase complexity of a hardware implementation. Also, the full range between minimal and maximal values that can be stored in the depth buffer can be utilized for each three dimensional scene, independent of the ratio of distances between the far and near planes of the view volume. Also, the invention can provide for user-controlled selection between highest depth resolution for objects close to the far plane of the view volume or close to the near plane of the view volume. Also, depth values do not need to be linearly proportional to distance or inverse distance in the view space, as required by W-buffers and inverse W-buffers, thereby supporting a larger set of 3D rendering applications.

These and other features and advantages of the present invention will become more apparent from the following description, drawings, and claims.

DRAWING

FIG. 1$a$ is a schematic diagram of a view volume in view space.

FIG. 1$b$ is a schematic diagram of a view volume transposed into screen space.

FIGS. 9$a$ through 9$f$ are depictions of 2 planes intersecting at a known angle (16 degrees for 9($a$), 9($b$) and 9($c$); 0.8 degrees for 9($d$), 9($e$) and 9($f$)) rendered using a prior-art fixed-point 16-bit Z-buffer (9(a), 9(d)), a prior art floating-point 16-bit 1/W buffer with 4 bits of exponent (9(b), 9(e)) and a complementary floating-point 16-bit Z-buffer with 4 bits of exponent (9(c), 9(f)).

Figure 10:
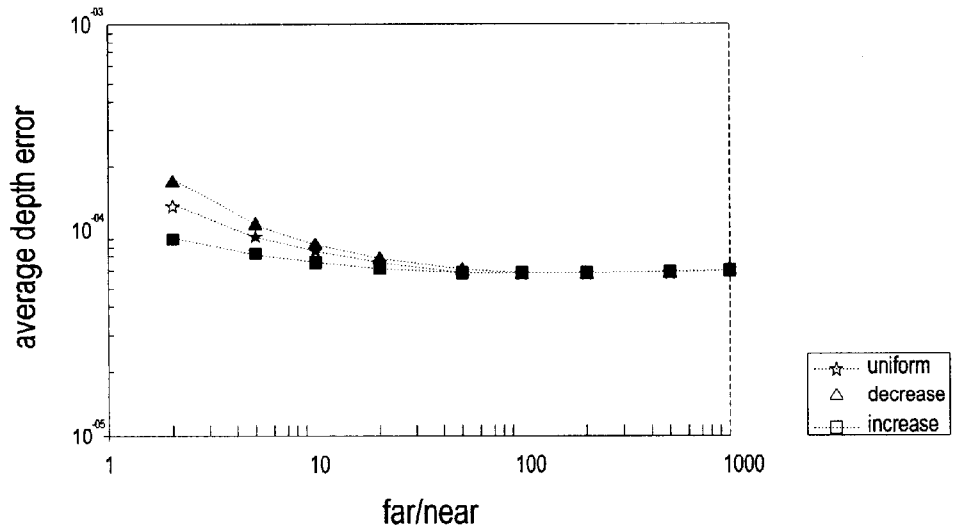

FIG. 10 is a chart displaying average depth error as a function of the far-to-near distance ratio for a complementary floating-point 16-bit Z-buffer in accordance with the present invention.

Figure 11:
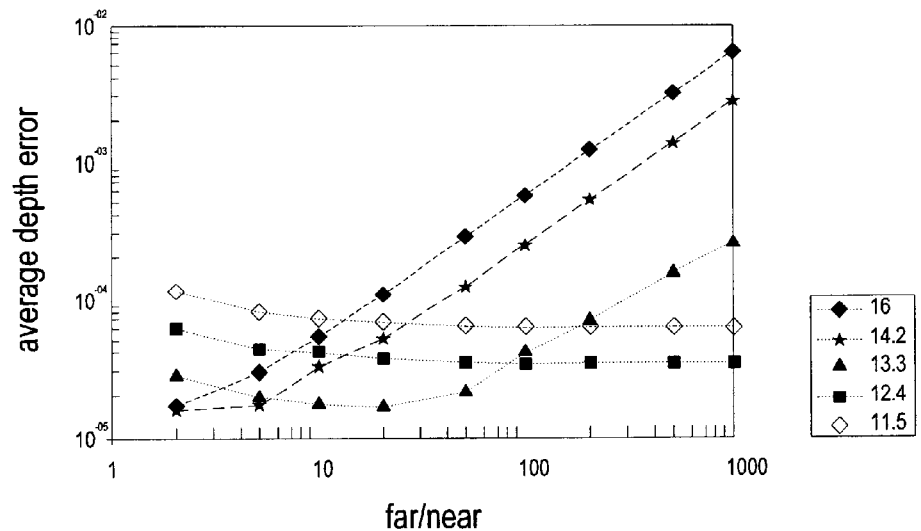

FIG. 11 is a chart displaying average depth error as a function of the far-to-near distance ratio for a complementary floating-point 16-bit Z-buffer with different numbers of bits of exponent and mantissa.

Figure 12:
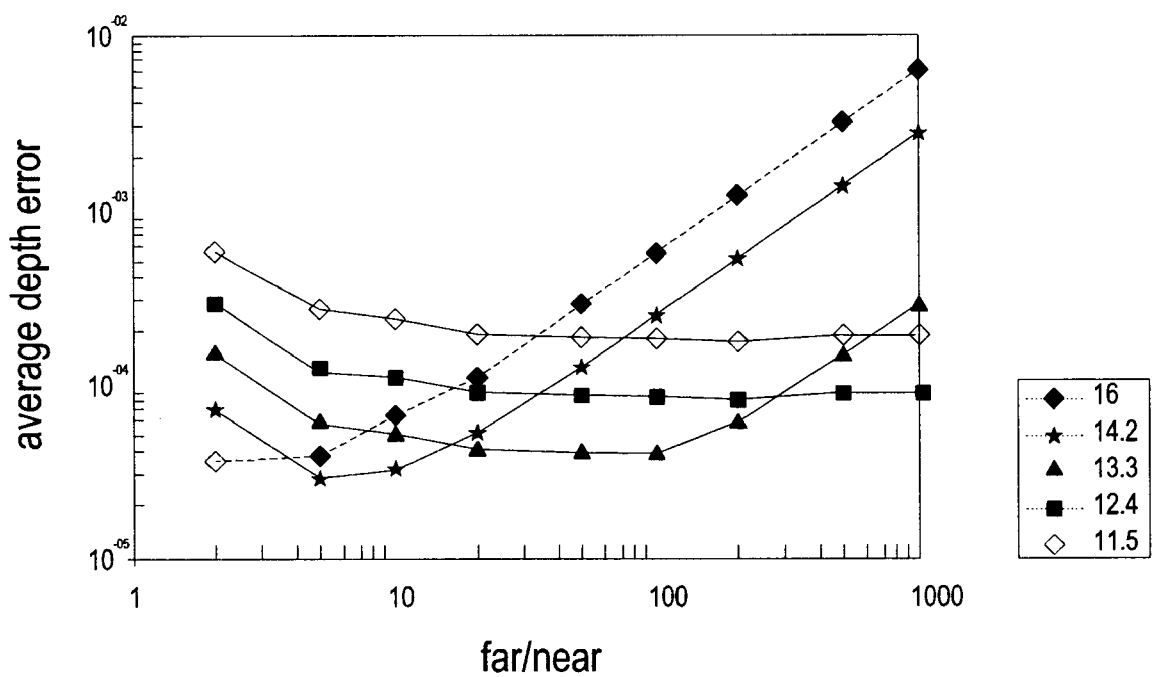

FIG. 12 is a chart displaying average depth error as a function of the far-to-near distance ratio for a floating-point 16-bit inverse W-buffer with different numbers of bits of exponent and mantissa.

Figure 13:
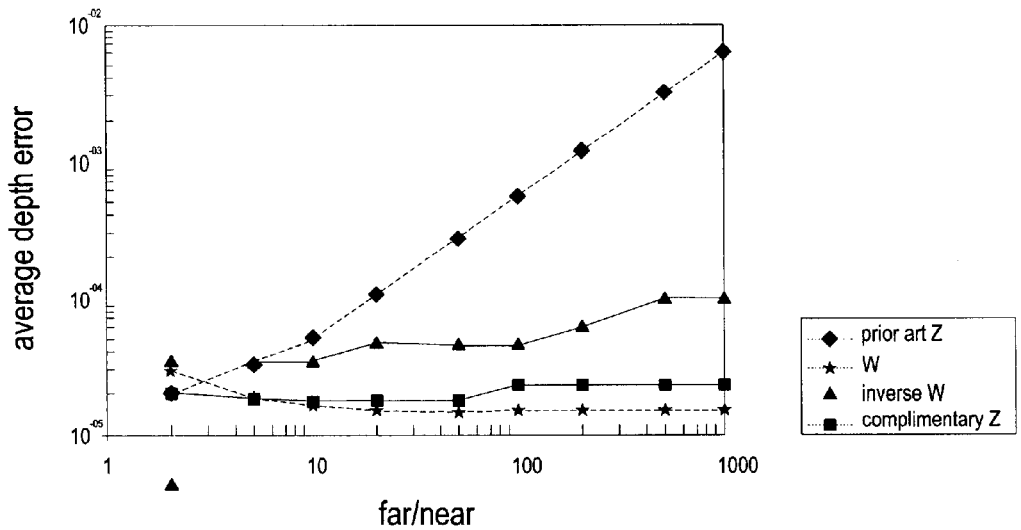

FIG. 13 is a chart comparing the average depth errors as a function of the far-to-near distance ratio for the following 16-bit buffers: a prior art Z-buffer, a prior art W-buffer, a prior art inverse W-buffer, and a complementary Z-buffer.

Figure 14:
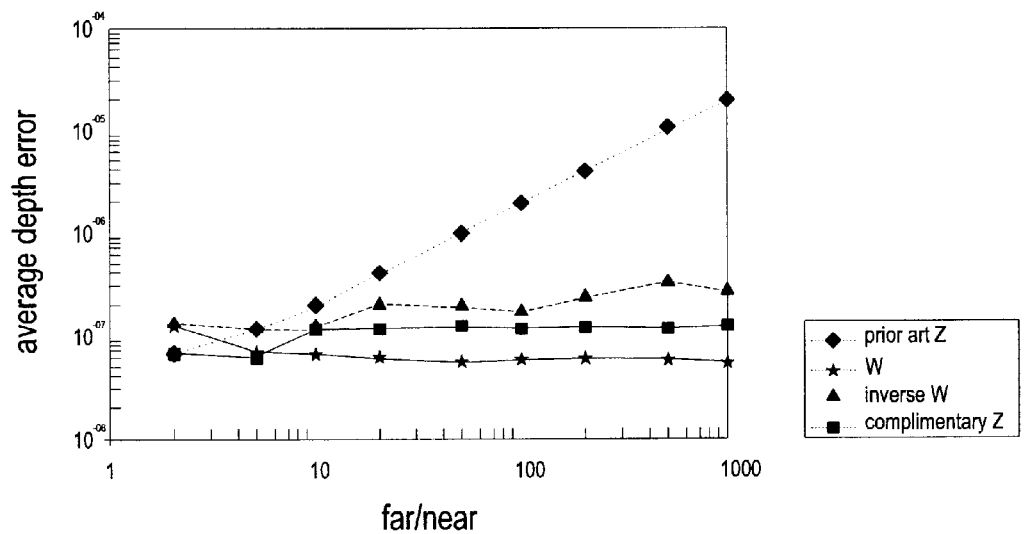

FIG. 14 is a chart comparing the average depth errors as a function of the far-to-near distance ratio for the following 24-bit buffers: a prior art Z-buffer, a prior art W-buffer, a prior art inverse W-buffer, and a complementary Z-buffer.

Figure 15:
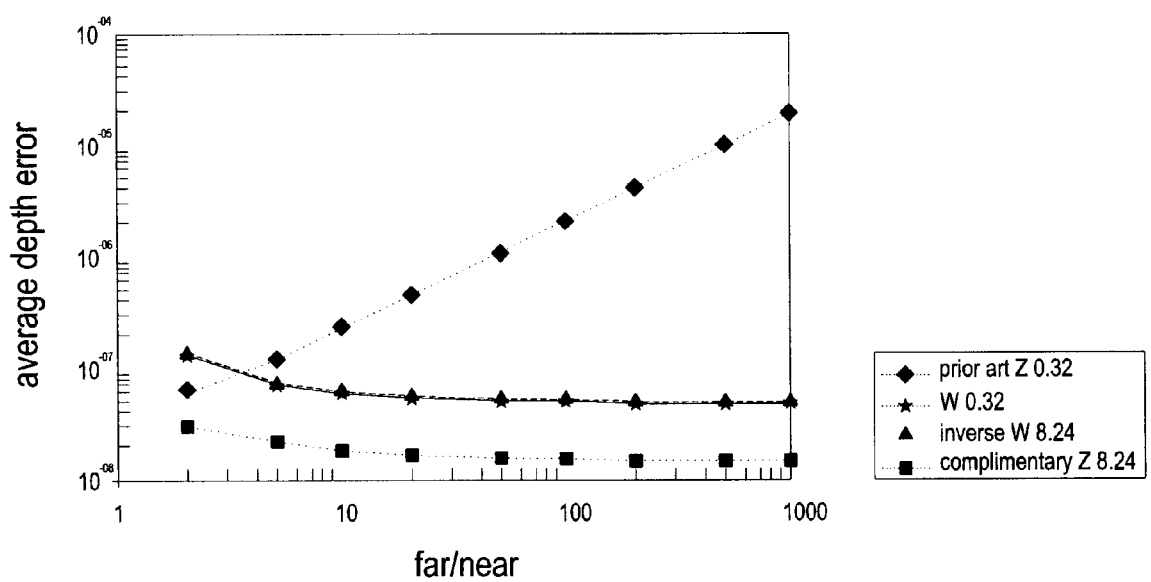

FIG. 15 is a chart comparing the average depth errors as a function of the far-to-near distance ratio for the following 32-bit buffers: a prior art Z-buffer, a prior art W-buffer, a prior art inverse W-buffer, and a complementary Z-buffer.

Figure 16:
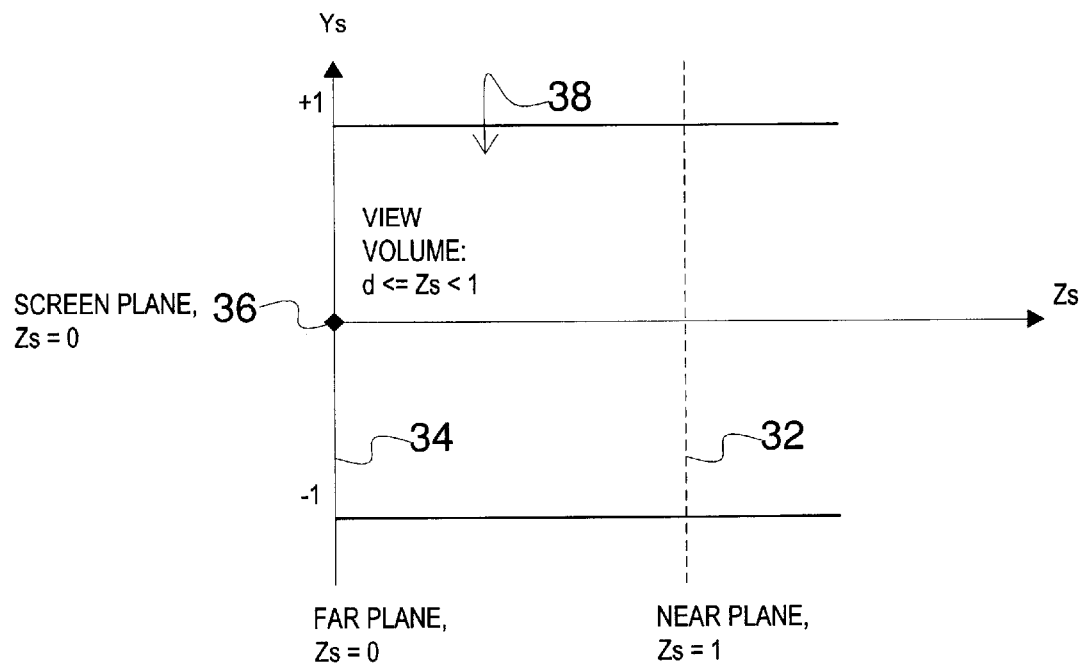

FIG. 16 is a schematic diagram of a view volume transposed into screen space using a floating-point complementary depth buffer.

Figure 17:
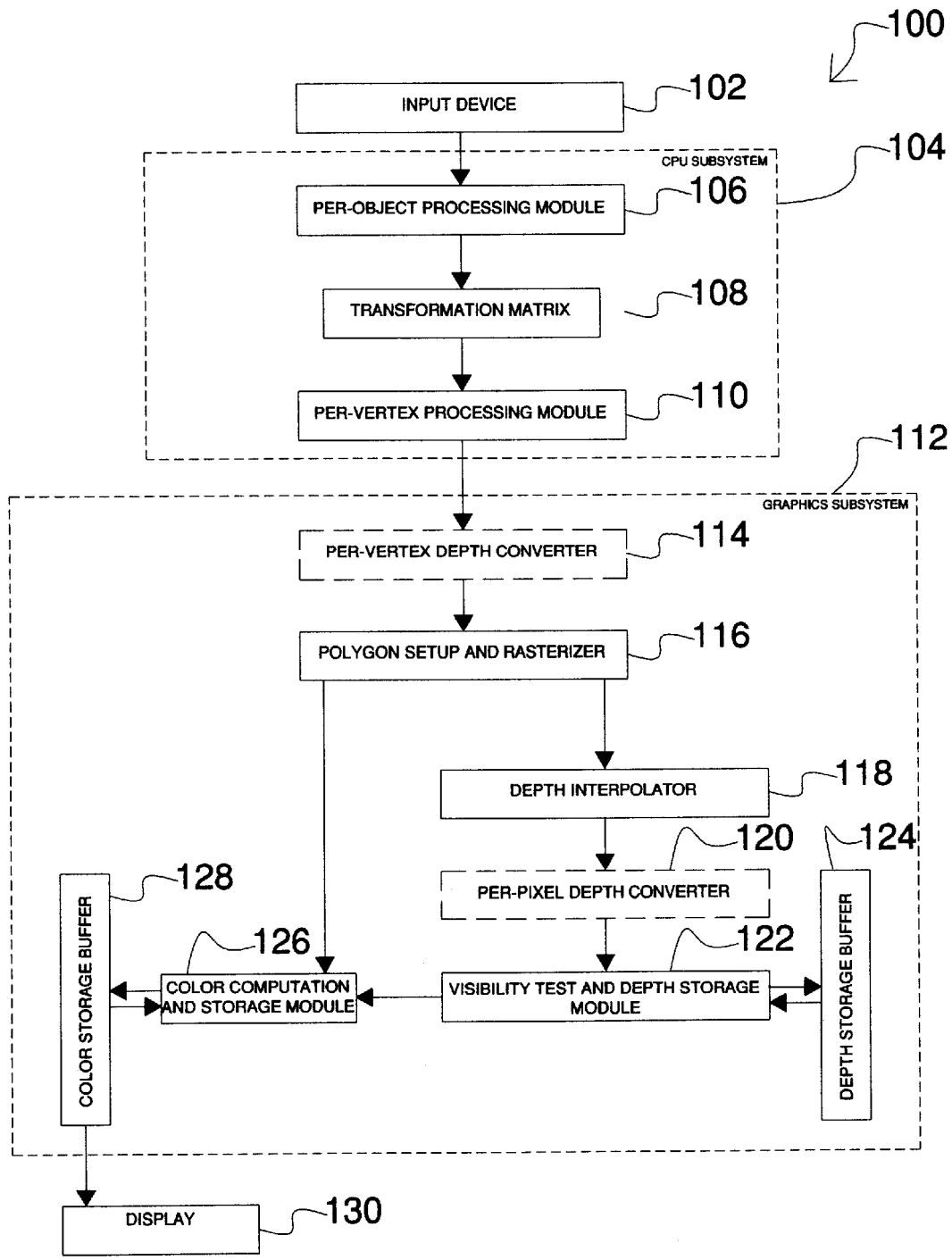

FIG. 17 is a schematic diagram of one embodiment for implementing a complementary depth buffer in a computer system.

DESCRIPTION

Figure 1A:
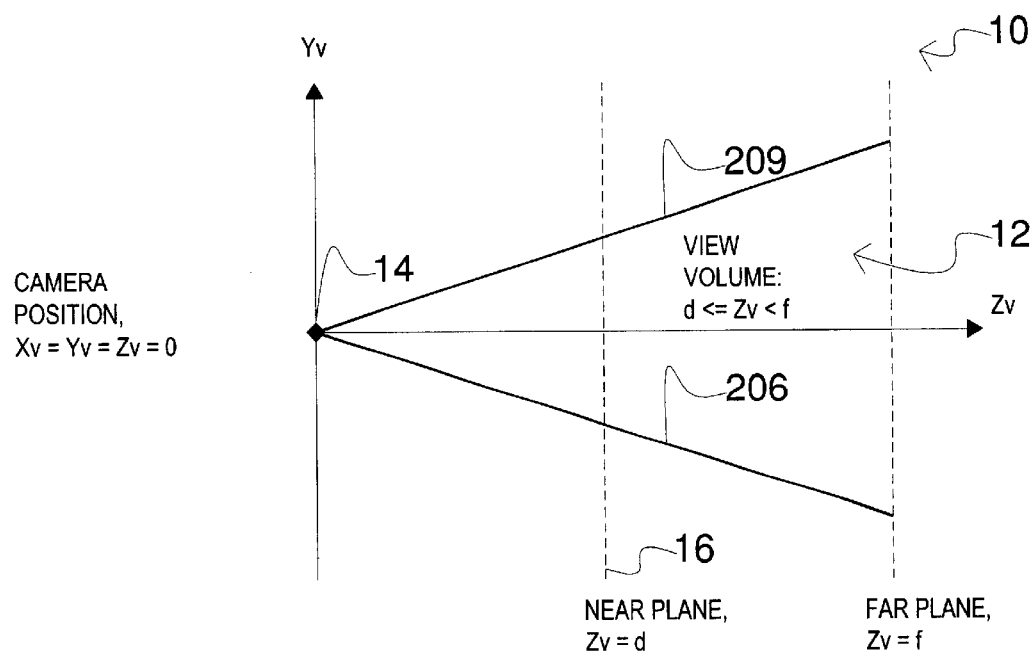

Referring to FIG. 1a, the geometry 10 of a scene rendered in 3-dimensional space with a camera positioned at the origin of coordinates, also known as the view space, is schematically shown. Elements of the scene are rendered only if they are located inside of view volume 12. View volume 12 has the shape of a truncated pyramid (or frustum) bounded by six planes: four sides of the pyramid intersect at the common origin of the camera location 14, and two planes bound the near 16 and far 18 distances from the camera. FIG. 1a shows two side planes of the pyramid projected as solid lines 21a and 21b to plane Y-Z, and the two planes 16 and 18 that bound distances from the camera: near plane 16 at distance d and far plane 18 at distance f.

Figure 1B:
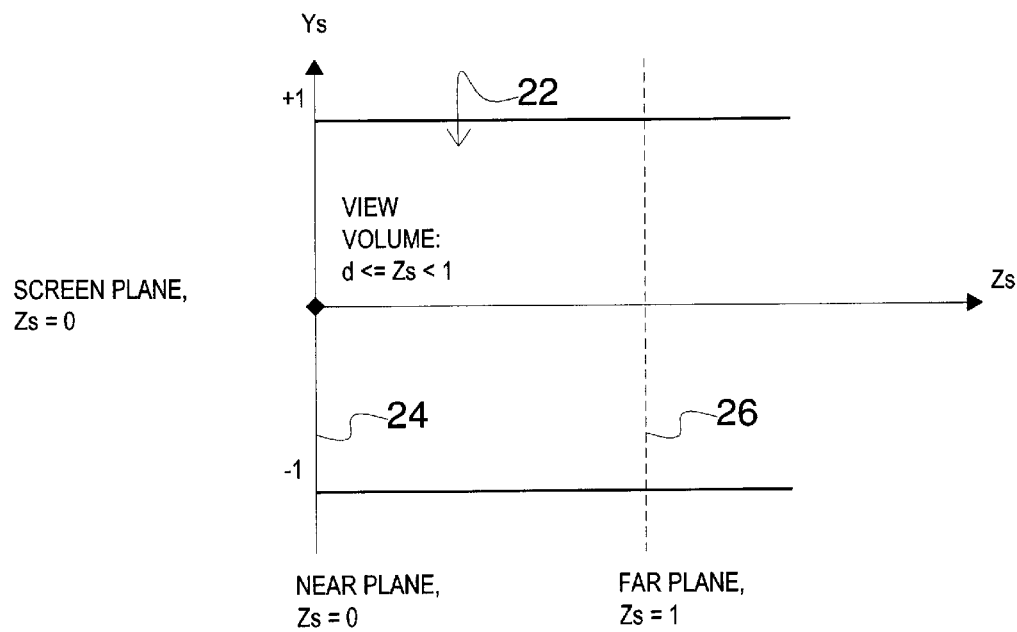

To render the scene from the camera viewpoint, all coordinates in the view volume are transformed into screen space, shown in FIG. 1b, using a projection transformation matrix, as known in the art. As a result of this transformation, the view volume 12 is transformed into a normalized cube 22, with one of its planes along the Z direction aligned with screen plane Z-Y (Z=0) and another plane 26 parallel to the screen at the normalized distance Z=1.0. Range [0,1] is mapped to the full resolution of the depth buffer to provide maximal precision. This space is known as a screen space.

As known in the prior art, the transformation of depth value from view space to screen space is described by equation [1]. As shown in FIG. 1b, the equation maps the near plane 16 (Zv=d) to the cube plane 24 at zero distance from the screen (Zs =0) and the far plane 18 (Zv=f) to the cube plane 26 at the maximal distance from the screen (Zs=1.0).

In order to compare such prior art representations of the distance to the camera of values stored in a conventional depth Z-buffer, with the novel methods of the present invention first a methodology for such a comparison is described.

Depth storage implementations affect the error of the depth buffer storage, which can be defined as the change of the distance in the view space 12 corresponding to the minimal change of the value stored in the depth buffer. The smaller the depth buffer storage error the better its precision and resolution. Depth buffer error typically changes with distance from the camera; therefore, to compare different depth buffer implementations, one can compare average depth errors for different scene parameters and areas of interest.

The principal factors affecting depth error in the view space are the mapping of the camera-object distance (Zv) to the depth in the normalized device coordinate (Zs) and the precision of the format used to represent the Zs value:

$$\delta Zv(Zv) = \frac{dZv}{dZs} * \delta Zs(Zs) \qquad [2]$$

The error of the Zs representation is estimated as the largest of two factors. First, there is a per-vertex error of Zs representation after computation of normalized device coordinates. The standard input format for Zs values, as for other per-vertex coordinates, is typically a 32-bit IEEE floating point format. Second, there is a per-pixel error of Zs representation in the depth buffer depending on its size and format.

Precision of a per-pixel Zs representation can be evaluated in the general case by using a floating-point format with n bits of exponent (e) and m bits of mantissa (f):

$$Zs = \begin{cases} 2^{e-2^n} * 1 \cdot f(2^n > e > o) \\ 2^{1-2^n} * 0 \cdot f(e = o) \end{cases} \qquad [3]$$

Equation [3] represents a mapping of the stored depth values to the normalized range of values in a particular floating-point storage format, from 0 to 1.0. It is one of the possible representations of a floating-point storage format, which may differ, for instance, by the presence or absence of the sign bit or by the particular mapping of the stored depth value to the normalized distance 1.0 in the screen space. For example, maximal normalized distance 1.0 in the screen space may be represented by the maximal value in the selected format (e=$2^n$-1, f=$2^m$-1), or it can be represented by any other single value reserved for this purpose. If a single storage value is reserved to represent 1.0, normalized distance in the screen space corresponding to this storage value according to equation [3] can be mapped to the storage value closest to that reserved to represent 1.0. Variations in representation of the single normalized distance by the storage format do not typically change the qualitative relationship between depth errors computed for different depth mapping functions with the same floating-point format. The sign bit, if present, decreases the total number of bits for mantissa or exponent for the same per-pixel buffer size, but does not typically change the qualitative relationship between depth errors computed for different depth mapping functions with the same floating-point format.

Integer format (n=0, e=0) is included in the general definition [3] as being equivalent to a floating-point format with 1 bit of exponent (n=1), or 0 bits of exponent (n=0), both representations producing identical sets of values.

Normalized mapping functions Zs(Zv) for 3 known prior art implementation are described by following equations:

$$Zs = \frac{f}{f-d} * \left(1 - \frac{d}{Zv}\right) \qquad \text{Z-buffer: [4]}$$

$$Zs = \frac{Zv}{f} \qquad \text{W-buffer: [5]}$$

$$Zs = \frac{d}{Zv} \qquad \text{Inverse W-buffer: [6]}$$

Here f is the distance from the camera to the far plane 18 of the view frustum and d is the distance from the camera to the near plane 16 of the view frustum.

Since depth error depends on the position of the sample within the view space, average depth error for the scene, normalized to the distance between far and near planes, should be computed for the known sampling distribution S(Zv) that defines the area of interest. Because storage precision changes in discrete steps, average normalized depth error is evaluated by accumulating results at multiple sampling positions:

$$\overline{\delta Zv} = \frac{\sum_{Zv=d}^{Zv=f} \delta Zv(Zv) * S(Zv)}{(f-d) * \sum_{zV=d}^{Zv=f} S(Zv)} \qquad [7]$$

where S(Zv) is a number of samples collected at the distance Zv from the camera. Depth error depends on the mapping functions (e.g., equations [4] to [6]) and the maximum of per-vertex (dZs_v) and per-pixel (dZs_p) representation errors:

$$\delta Zv(Zv) = |Zv(Zs+\max(dZs\_v, dZs\_p)) - Zv(Zs)| \qquad [8]$$

Equations [2] through [8] are sufficient to evaluate average normalized depth error for known sampling distribution S(Zv).

Figure 2:
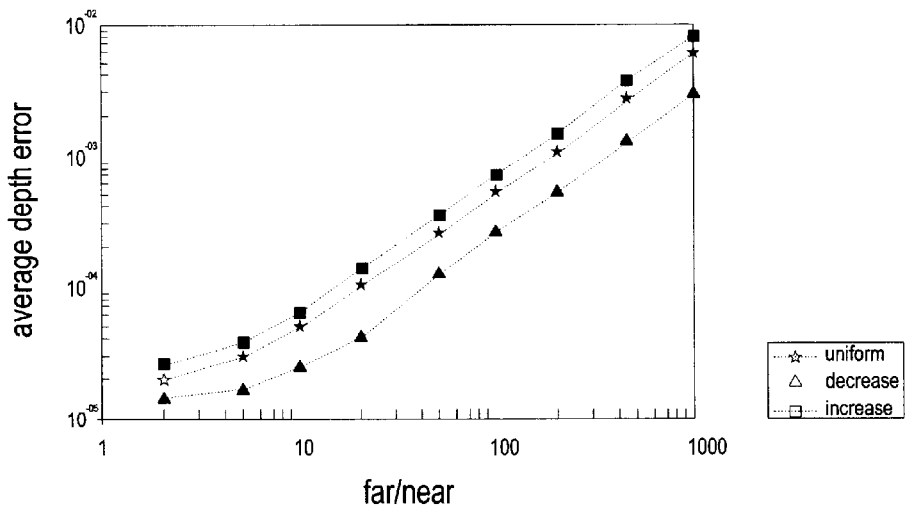
FIG. 2 is a chart displaying average depth error as a function of the far-to-near distance ratio, for a prior art fixed-point 16-bit Z-buffer.
Figure 3:
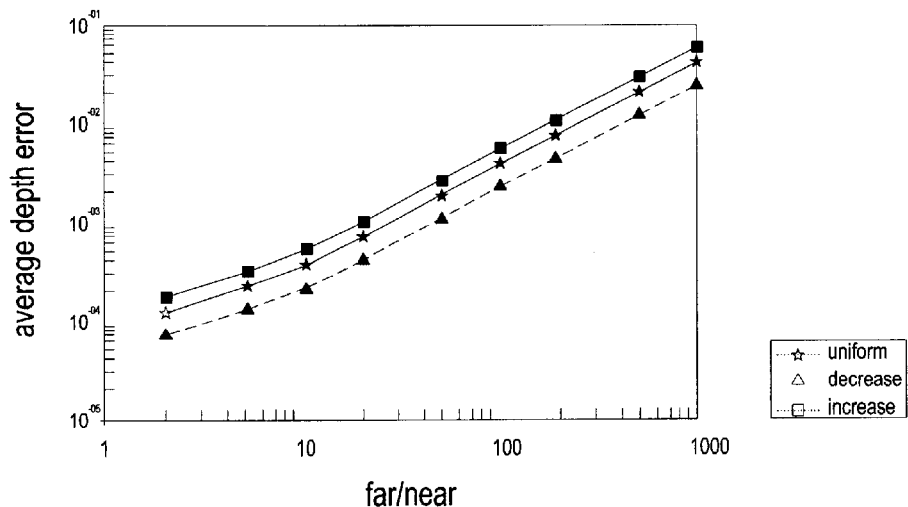
FIG. 3 is a chart displaying average depth error as a function of the far-to-near distance ratio, for a prior art floating-point 16-bit Z-buffer.

FIGS. 2 and 3 show average depth error as a function of the ratio between distances to the far and near plane for a 16-bit Z-buffer (as defined by equation [4]) for 3 different sampling functions: uniform, increasing from 0 at the near plane (most of the samples are close to far plane), and decreasing to 0 at the far plane (most of the samples are close to the near plane). Data for fixed-point storage (zero exponent, 16-bit mantissa) are presented in FIG. 2, and data for floating-point storage (4-bit exponent, 12-bit mantissa) are presented in FIG. 3. The data shows that average depth error in typical prior art Z-buffer methods increases significantly with the increase of the far/near ratio, that it is dependent on the distribution of samples in the 3-dimensional space, and that floating-point storage format decreases average precision.

Figure 4:
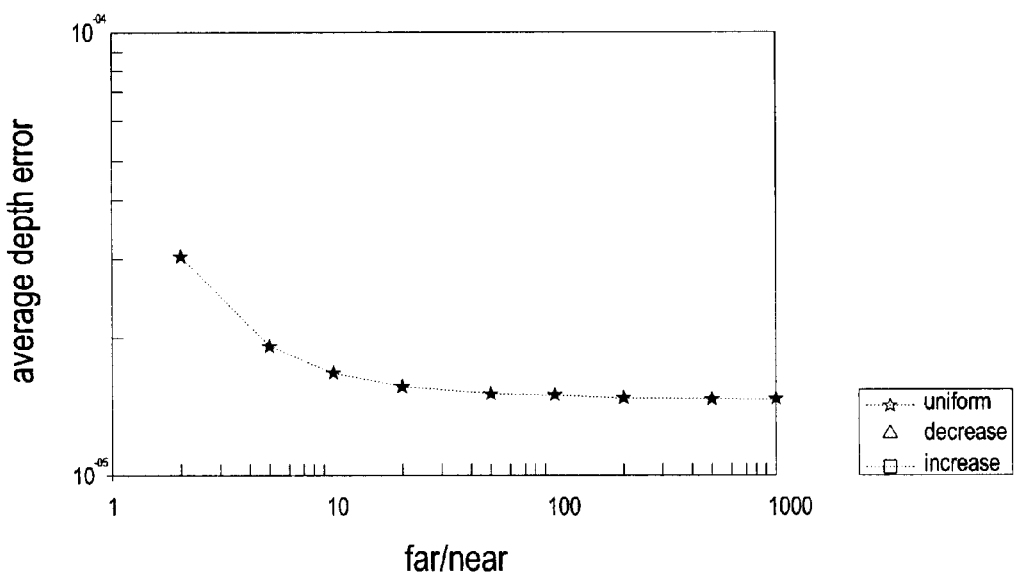
FIG. 4 is a chart displaying average depth error as a function of the far-to-near distance ratio, for a prior art fixed-point 16-bit W-buffer.
Figure 5:
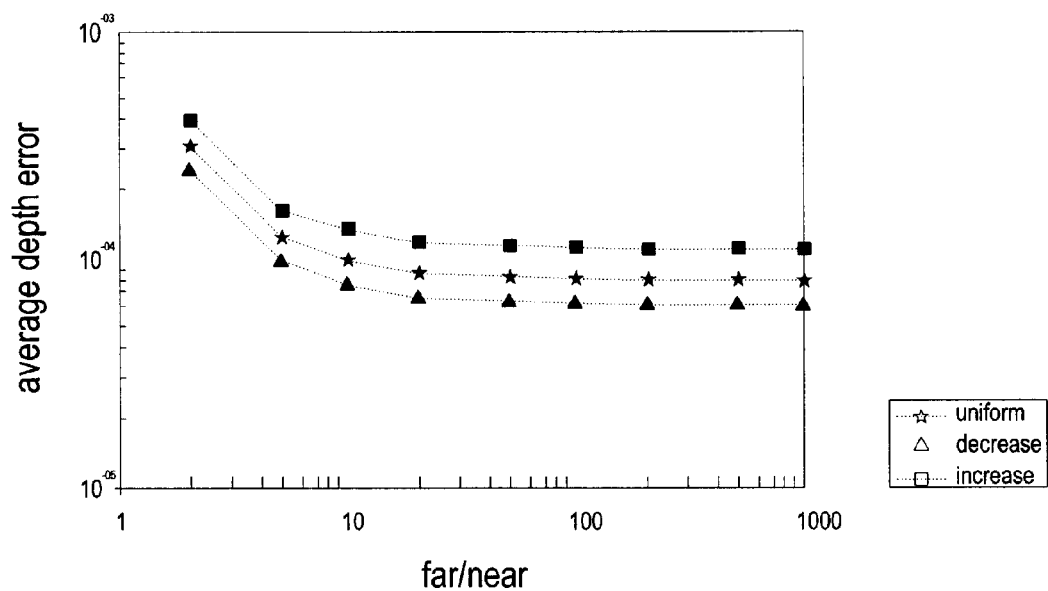
FIG. 5 is a chart displaying average depth error as a function of the far-to-near distance ratio, for a prior art floating-point 16-bit W-buffer.

FIGS. 4 and 5 show average depth error for a W-buffer (as defined by equation [5]) and the same combinations of sampling distributions and storage formats as in FIGS. 2 and 3.

Figure 6:
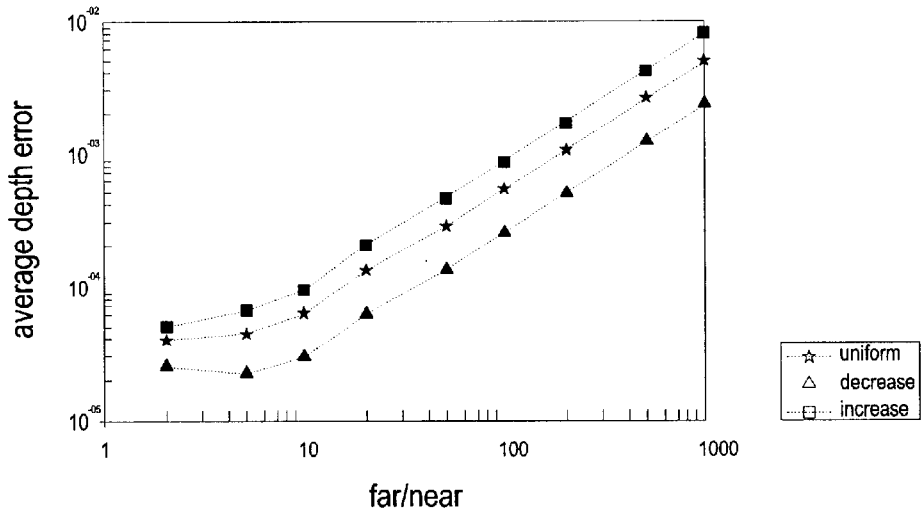
FIG. 6 is a chart displaying average depth error as a function of the far-to-near distance ratio for a prior art fixed-point 16-bit inverse W-buffer.
Figure 7:
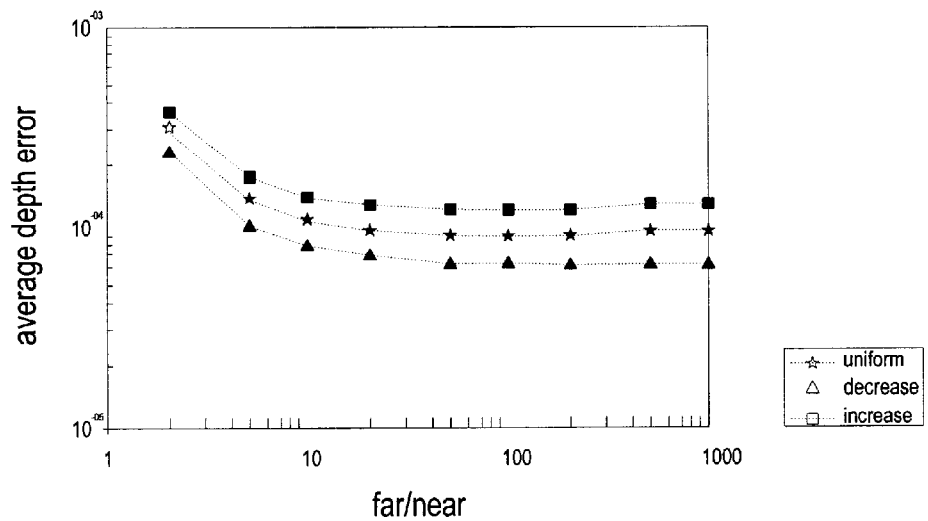
FIG. 7 is a chart displaying average depth error as a function of the far-to-near distance ratio for a prior art floating-point 16-bit inverse W-buffer.

FIGS. 6 and 7 show average depth error for an inverse W-buffer (as defined by equation [6]) and the same combinations of sampling distributions and storage formats as for Z and W-buffers.

Comparison of these prior art implementations of the depth buffer shows that a W-buffer with fixed-point storage typically displays the best overall precision and no dependency on sampling distribution. On these criteria, a floating-point inverse W-buffer is the second best, followed by a fixed-point Z-buffer.

The general success of a W-buffer results from the generally linear character of the correspondence between Zv and stored values: mapping function Zv(Zs) is linear because Zs is proportional to Zv (see equation [5]), and the representation function is linear due to fixed-point storage: error does not depend on the stored W value. As a result, error of the distance from the camera to the sampling point remains generally independent from the value of this distance.

Unfortunately, the value of Zv in these prior art methods can not be interpolated from its per vertex stored depth values. To produce correct results, 1/Zv or 1/W has to be interpolated instead and converted to Zv or W using a numerically costly high-precision division 1/(1/W). Similar operations may need to be performed for perspective-correct texture mapping. However, in such cases, precision requirements may be significantly lower and the operation sometimes can be accomplished with a small look-up table. If used for depth buffering, per-pixel division typically must be performed with IEEE floating-point precision, which can make it impractical for the current 3D hardware accelerators.

The present invention achieves precision results similar to those produced with a W-buffer—that is, close-to-linear correspondence between Zv and stored depth values—without maintaining linearity for both mapping and representation functions. Instead, the present invention uses non-linear mapping and representation functions that compensate the non-linear behavior of each other, providing nearly linear correspondence between distance from the camera and stored depth.

In the present invention, a new screen depth Zs is computed by subtracting a conventional normalized Z-buffer value [4] from the maximal depth value 1.0:

$$Zs = 1 - prior\_art\_Zs = \frac{d}{f-d} * \left(\frac{f}{Zv} - 1\right) \qquad [9]$$

Storage of these values, for every coordinate location of interest, can be termed a "complementary Z-buffer." As in the prior art Z-buffer implementations described by equation [4], the present invention maintains a mapping to the full depth range [0,1] and also allows linear interpolation in the screen space. But the changes in distance are reflected differently: when distances change, stored depth values decrease instead of increasing as the sampling point moves further from the camera. To compensate for this change, a graphics application may need to reverse its depth test function. For example, one can use the condition Z>Zstored to determine visible pixels instead of Z<Zstored, and change the signs of Z bias and polygon offset used to determine visible pixels. These changes are similar to ones used with the inverse W-buffer, which also uses storage values that decrease with an increase of the distance from the camera.

In one embodiment of the present invention, each screen depth value Zs described by equation [9] is stored in floating point format, for instance, using representation [3].

As in the case of the prior art Z-buffer, non-linear mapping error for Zs is largest when Zv is close to f. At the same time, floating-point format precision error is smallest when Zs is close to 0. Because function [9] maps far clipping plane (Zv=f) to Zs=0, these 2 factors compensate each other in the areas distant from the camera, which contribute most to the average error, thereby yielding a fairly linear error response for different ratios of near/far distances.

Figure 8:
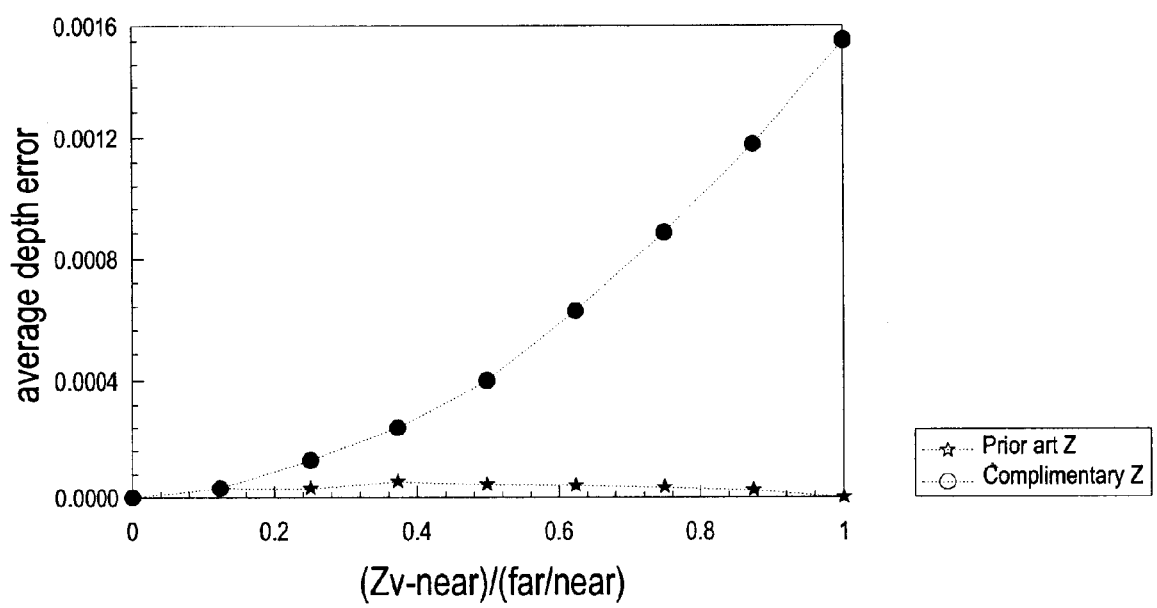
FIG. 8 is a chart displaying average depth error as a function of the far-to-near distance ratio for a prior art fixed-point 16-bit Z-buffer and a complementary 16-bit floating-point Z-buffer in accordance with the present invention.

Such compensation is effective enough to make depth error almost independent of the distance to the camera, making it orders of magnitude smaller than for a prior art Z-buffer of the same size (FIG. 8).

As an example of precision improvement, FIGS. 9a through 9f show a black plane 60 and white plane 62 intersecting at a known angle and rendered using three different types of depth buffers with the same per-pixel storage size of 16 bits. Each scene has a ratio of f/d=1200 and a range of normalized distances to points in the planes from the camera in the view space Zv/f=[0.62..0.88]. In the ideal case of unlimited precision, the intersection 64 of two planes 60 and 62 should be a straight line for any non-zero angle. Decrease of the intersection angle brings planes closer together, increasing the depth precision required to properly resolve intersection area.

Figure 9A:
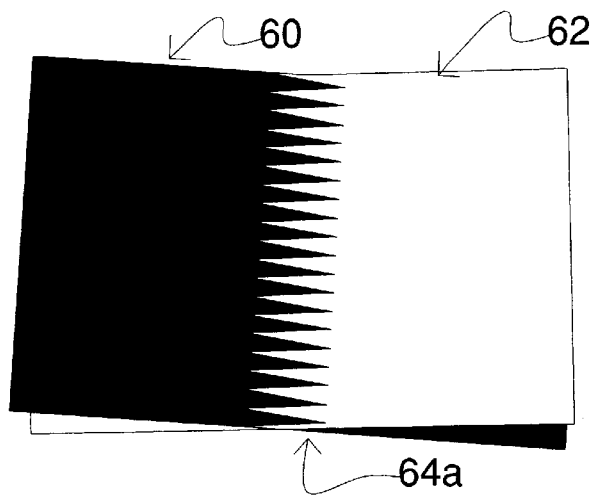
Figure 9B:
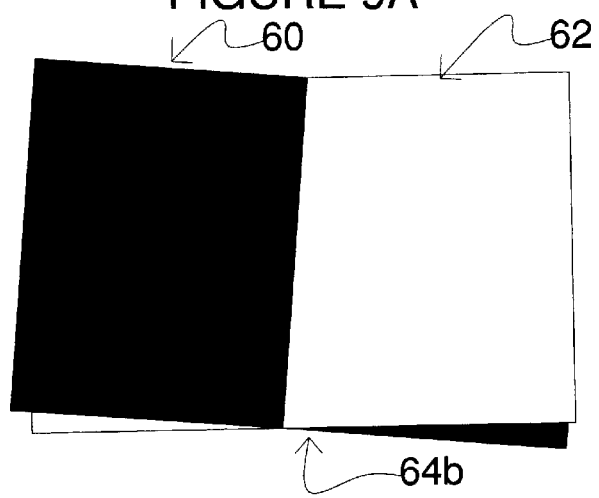
Figure 9C:
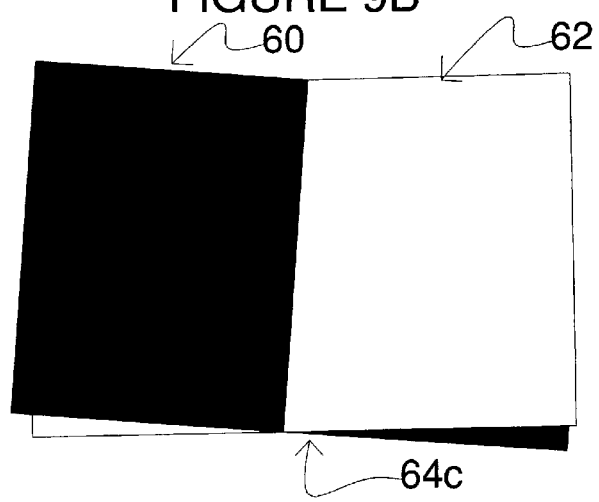

FIGS. 9a, 9b and 9c depict planes 60 and 62 intersecting at a 16 degree angle. Use of prior art fixed-point Z buffer (FIG. 9a) shows significant errors due to its lack of precision (see, for example, the jagged pattern at the intersection 64a). Prior art floating-point 1/W buffer with 4 bits of exponent (FIG. 9b) and complementary floating-point Z-buffer with 4 bits of exponent (FIG. 9c) show adequate precision to render the intersection region (64b and 64c) as a substantially straight line.

Figure 9D:
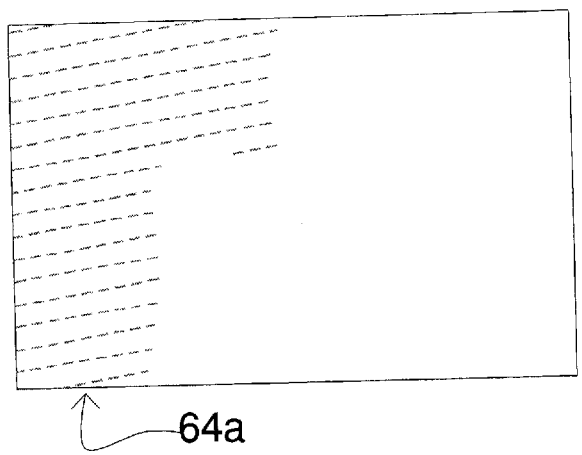
Figure 9E:
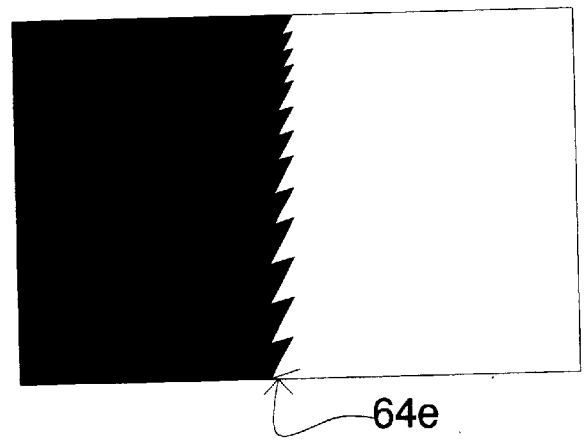
Figure 9F:
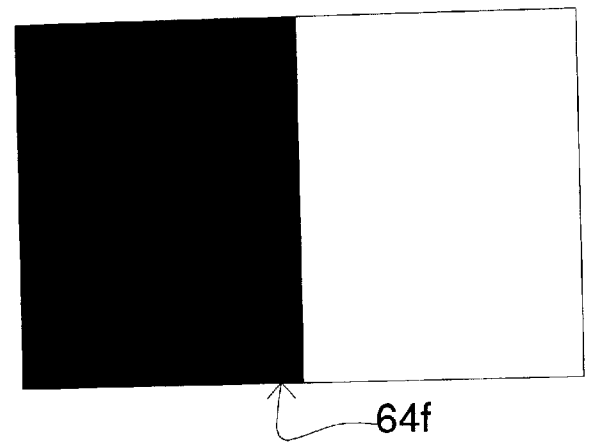

FIGS. 9d, 9e and 9f depict planes 60 and 62 intersecting at a 0.8 degree angle, which roughly corresponds to a 20× increase in required depth precision compared with a 16-degree angle. In this case, prior art fixed-point Z-buffer (FIG. 9d) fails to resolve plane intersection, creating a semi-random pattern 64d instead of a correctly ordered linear intersection. Using a prior-art inverse W buffer with 4-bits of exponent (FIG. 9e) provides significantly better precision, but still exhibits severe visual artifacts in the intersection area 64e (jagged pattern). Using a complementary floating-point Z-buffer with 4-bits of exponent (FIG. 9f) produces an intersection area 64f as a substantially ideal straight line, demonstrating significantly better depth precision compared with both prior art solutions.

FIG. 10 shows average depth error in the 16-bit complementary screen depth Zs (or floating-point Zs) buffer (4 bits exponent, 12 bits mantissa) as a function of the ratio between distances to the far and near planes and three different sampling functions: uniform, increasing from 0 at the near plane (most of the samples are close to far plane), and decreasing to 0 at the far plane (most of the samples are at the near plane). Data for fixed-point storage (zero exponent, 16-bit mantissa) are the same as in FIG. 2 for the fixed-point storage prior art Z-buffer.

These results demonstrate that the precision of a complementary Z-buffer benefits from using floating-point storage format, that the results depend significantly less on the sampling distribution than with prior art Z and inverse W-buffers, and that the absolute value of average depth error is smaller than for the prior art Z-buffer and inverse W-buffer. While average error for a 16-bit depth buffer according to the present invention can remain up to 2 times larger than for a prior art W-buffer, the present invention does not require additional per-pixel operations for translations to view distance which makes its suitable for implementation with low-cost 3D graphics accelerators.

In addition to implementing equation [9] and floating-point storage, the present invention addresses the issue of selecting an optimal floating-point format for the constant per-pixel storage size. FIG. 11 shows average depth error as a function of the far/near ratio for different sizes of mantissa and exponent in the same 16-bit buffer. The results are shown for a uniform sampling distribution.

As the results demonstrate, 2 bits of exponent are optimal if the far/near ratio is below 5, 3 bits of exponent are optimal when far/near ratio is below 100, and 4 bits of exponent are best for far/near ratios above 100 and at least as large as 1000. These ranges are valid for uniform sampling distribution but may change if the area of interest confines most of the samples to the narrow region of distances from the camera. In this case, the ratio of the maximal distance from the camera inside of the area of interest to the distance from the near plane can be used instead of the far/near ratio to select an optimal floating-point format. In order to further increase depth precision at a given size of the depth buffer, one can select the number of exponent bits in the floating-point storage format based on the scene parameters known before the start of the rendering process for a current frame. In one embodiment of the present invention, such scene parameters may include a known ratio of the distances to the far and near planes and the sampling distribution. Equation [7] can be used to determine average depth error for different sizes of exponent and to select the best exponent size.

Selection of the exponent size based on known scene parameters can also handle a fixed-point format as a special case with the number of bits of exponent equal to zero or one. As the results of FIG. 11 show, a fixed-point format can be selected for very small far/near ratios or when the area of interest is very close to the near plane.

Selection of exponent size based on known scene parameters is not confined to the complementary Z-buffer proposed in the present invention and described by equation [9]. While the prior art Z-buffer (equation [4]) and W-buffer (equation [5]) always produce best resolution with fixed-point storage, test results indicate that inverse W-buffer (equation [6]) may benefit from per-frame selection of exponent size. FIG. 12 shows results for a 16-bit inverse W-buffer at different sizes of exponent and uniform sampling distribution (e.g., "13.3" denotes 13 bits mantissa and 3 bits exponent).

These results show that the selection of exponent size based on known scene parameters increase inverse W-buffer resolution as compared with the prior art, where one size of exponent is used for all scenes. At the same time, the precision of an inverse W-buffer remains lower and is more dependent on the sampling distribution than for the complementary Z-buffer proposed in the present invention.

FIGS. 13, 14 and 15 compare results for 3 prior art depth buffers and the complementary Z-buffer accordingly to the present invention. In all cases results are produced for uniform sampling distribution. Results for inverse W-buffer and complementary Z-buffer are shown for the exponent sizes specially selected for each far/near ratio to increase precision in accordance with present invention. FIG. 13 shows comparison results for a 16-bit buffer. FIG. 14 shows results for a 24-bit buffer. FIG. 15 shows results for a 32-bit buffer.

The results of FIGS. 13 and 14 demonstrate that a complementary Z-buffer, as described in the current invention, typically has better resolution than either the prior art Z-buffer or inverse W-buffer. For 16 bit/pixel and 24 bit/pixel depth buffer sizes, the resolution of a complementary Z-buffer remains up to 2 times lower than for a fixed-point W-buffer. However, a complementary Z-buffer is simpler to implement than a W-buffer and does not require additional per-pixel operations that may decrease overall hardware performance.

An advantage of a complementary Z-buffer over a prior art inverse W-buffer can be explained by the fact that a complementary Z-buffer most effectively uses increased resolution of floating-point storage for small storage values by mapping the largest distance from the camera (Zv close to f) to the smallest stored depth values (Zs close to 0). In contrast, an inverse W-buffer maps the Zv=f to non-zero value Zs=d/f, using the increase of the floating-point precision less effectively. An inverse W-buffer mapping is especially ineffective when d/f is close to 1; in this case, most of the range of the stored depth values may remain unused. A complementary Z-buffer according to the present invention does not have this disadvantage because it generally maps the range of distances from the camera [d, f] to substantially the full range of stored depth values [0,1].

The results of FIG. 15 show that at a large size of per-pixel depth storage (e.g., 32 bits) a complementary Z-buffer provides the best depth precision in comparison with previous solutions. At 32 bits/pixel, average depth errors of both the W-buffer and inverse W-buffer become very close, because they are influenced by per-vertex precision of the input (IEEE 32-bit floating-point) rather than storage format precision. Precision of the W-buffer is generally optimal with fixed-point storage, but the floating-point input format limits its effective resolution by decreasing the number of mantissa bits in comparison with a fixed point format.

32-bit IEEE floating point input format is optimal for current CPUs. While it is possible to compute input data with double floating-point precision (64 bits with 52 bits of mantissa), currently such formats significantly slow down computation speed and may require up to twice the bandwidth to deliver geometry data to graphics hardware. However, should 64-bit microprocessors become standard, a complementary Z-buffer can become even more advantageous. The complementary Z-buffer proposed in the current invention provides best depth precision in comparison with prior art solutions, when error of depth representation is limited by the input floating-point format but not by the storage format. A complementary Z-buffer in accordance with present invention can be implemented using a variety of possible embodiments. In one embodiment of the invention, a complementary Z value described by equation [9] is computed by modifying a conventional transformation matrix from view to screen space. For instance, as described in Watt, A., 3-*D Computer Graphics*, 2$^{nd}$ Ed., 1993, Addison-Wesley Publishing Co., members of perspective-projection matrix f/(f−d) and (−d*f)/(f−d) are replaced by (−d)/(f−d) and d*f/(f−d), correspondingly. The result of such a transformation is shown in FIG. 16: the far plane is mapped to the screen plane 34 (Zs=0), while the near plane is mapped to the cube plane 32 at the maximal distance from the camera (Zs=1). This embodiment provides generally the best precision for calculation of complementary Z values with absolute magnitude close to 0.

In another embodiment, a per-vertex operation Zs=1−prior_art_Zs is performed after coordinates in the screen space are computed using a conventional transformation matrix. This allows the depth value to be converted even in the case when the perspective-projection matrix is not known to the graphics software driver. After conversion, the Zs coordinates are interpolated for every pixel and stored in floating-point format, adjusted to a pre-defined number of exponent and mantissa bits. This embodiment generally provides less precision for calculation of complementary Z values with absolute magnitude close to 0 than a modification of the perspective-projection matrix, because when prior_art_Z is close to 1, its precision is limited by the number of bits of mantissa in its input format (e.g., 23 bits in IEEE floating-point format), while its exponent remains constant, making the precision of Zs=1−prior_art_Z also limited by its mantissa precision ($2^{-23}$), instead of the full floating-point precision. An embodiment that uses a modification of the perspective-projection matrix can generally avoid this loss of precision by using small floating-point values, proportional to d/(f−d), during the computation of complementary Z. Even if an embodiment using Zs=1−prior_art_Z is less precise, it generally provides significantly better precision than a prior art Z buffer and, in most cases, better precision than a 1/W-buffer. This embodiment can be used for applications that do not provide their perspective-projection matrix to the graphics software driver. Support for such applications can be important to make a complementary Z buffer a universal solution, one that works with a wide class of 3D graphics applications.

In another embodiment, conversion to Zs is performed for every pixel after interpolation. It can also be accompanied by a scaling operation, in order to take advantage of the full precision of the depth buffer. This embodiment can be useful, for instance, when 1/W is used both for perspective-correct texture mapping and depth storage. If equation W=Zv is valid, a per-pixel operation on 1W $$Zs=A*1/W+B,\quad[10]$$

where A=(f*d)/(f−d), B=−d/(f−d) produces the same result as Zs=1− prior_art_Zs.

It is also possible to combine per-vertex and per-pixel conversion operations in the same implementation. In one embodiment, Zs=prior_art_Zs−1 is calculated per vertex using the same means as used to add Z bias. The resulting Zs values will cover range [−1,0], but the absolute value of the depth will still decrease with an increase of the distance to the camera. To avoid storage of the sign bit, only the absolute value is stored in the depth buffer; the sign can be restored when the depth value is read for visibility test comparisons.

Depending on a particular embodiment, other global calculations or values that affect visibility testing and rendering may also need to be changed. If a Z bias operation is performed after conversion to a complementary Z-buffer, the Z bias value must generally change sign. The same is true for a polygon offset factor. If the Z clipping is performed after a Zs=prior_art_Zs−1 operation, clipping thresholds should be changed from [0, 1] to [−1,0]. If the depth value read from the depth buffer equals Zs=1−prior_art_Zs, a depth comparison function used for visibility testing should reverse its testing condition: for instance, instead of determining that "a pixel is visible if new Z is less than or equal to old Z" the function should determine that "a pixel is visible if new Z is greater than or equal to old Z". Such a change is not required if the depth value is computed as prior_art_Zs−1 with the negative sign restored after reading the value from the depth buffer.

According to the present invention, the size of the exponent in the floating-point format used to store the depth value of a given size can be selected for each frame based on known scene parameters. This selection can also be extended to the choice between floating-point format and fixed-point format.

Other embodiments are possible for storage of depth values in different formats. In one embodiment, depth values are always calculated with a large number of exponent and mantissa bits (for instance, depth values can be interpolated using 8 bits of exponent and 28 bits of mantissa) and the calculation result is converted to a value with the number of exponent and mantissa bits selected for storage format (for instance, a floating-point value with 4 bits of exponent and 12 bits of mantissa, or a floating-point value with 5 bits of exponent and 19 bits of mantissa, or a 24-bit integer value). In another embodiment, depth values can be computed with precision corresponding to selected storage format (for instance, depth values can be interpolated using the same number of bits of exponent as used for the storage of the result as a floating-point value, or depth values can be interpolated as integers if the result is stored as an integer value).

While a complementary Z-buffer generally produces better results than prior art Z-buffer or inverse W-buffer implementations, it may be beneficial to allow an application to use a variety of depth buffer methods for compatibility reasons. Therefore, a complementary Z-buffer might be enabled or disabled based on a control signal coming from an application or from an end user. Enabling or disabling of a complementary Z-buffer can be accomplished in multiple ways, depending upon implementation. If implemented using a change of the transformation matrix, the matrix can be reversed to the values used for, e.g., a prior art Z-buffer; if implemented with a per-vertex 1−prior_art_Zs computation, the module can be bypassed; if using Z bias to compute prior_art_Zs−1 and ignoring the sign, disabling of the complementary Z-buffer can be accomplished by returning Z bias to the prior art value.

FIG. 17 shows a block-diagram of one possible computer system 100 for rendering three-dimensional objects onto a display 130 using depth evaluations and visibility testing in accordance with the present invention. Several optional blocks are also shown in dotted line (blocks 114 and 120) that can be included to perform calculations for certain alternative embodiments of the invention.

One or more input devices 102 receive information regarding objects within a computer graphics scene. These devices can include, among other things, keyboards, computer mice, tablets, and the like, for use by a computer programmer in devising a scene, or joysticks and the like by a user operating a computer graphics program, such as a game.

Within a CPU subsystem 104 (which can be implemented, e.g., by a microprocessor, and associated memory and stored control program(s)), a per-object processing module 106 performs high-level processing of each object in the scene, based upon its inputted characteristics. Per-object processing module 106 then provides one or more transformation matrices 108 that provide complete information about transforming the local coordinate information of each object into the common coordinate system of the screen space, given a particular camera angle, field of view, and other parameters.

A per-vertex processing module 110 uses the transformation matrices 108, and the inputted object information to transform each vertex of each polygon constituting the scene objects into final screen coordinates. That information can then be downloaded to a graphics subsystem 112, provided, for example, in a specialized graphics processing chip set or card attached to the CPU subsystem 104. In one alternative, per-vertex depth converter 114 transforms, e.g., the prior-art depth Z for each vertex provided by per-vertex processing module 110 into a complementary depth, e.g., 1−Z (or Z−1), for use in the methods of the present invention. Alternatively, the complementary depth function can be provided in the transformation matrices 110 themselves, eliminating the need to perform further transformations in the graphics subsystem 112.

Polygon setup and rasterizing module 116 takes the polygon information provided by per-vertex processing module, and begins the process of final rasterization, including computing gradients across a polygon, the slopes at edges, and positions of pixels. Depth interpolator 118 takes the vertex coordinates of each polygon and interpolates the depth of a pixel based upon the depths of its surrounding vertices. If vertex depths have already been transformed to complementary depth values by a per-vertex depth converter 114, then the interpolated pixel depths produced by depth interpolator 118 will already be complementary depth values. Otherwise, a per-pixel depth converter 120 can, at this stage, transform, e.g., an interpolated Z value of a pixel into a complementary interpolated value (e.g., 1−Z or Z−1). Even if the per-vertex depth values are already transformed into complementary depth values, the per-pixel converter 120 can provide additional functions, such as reversing the sign of depth (e.g., transforming negative Z−1 values into positive 1−Z complementary depth values). The per-pixel converter 120 can also perform format conversions (from, e.g., a high precision integer or floating-point number (from the depth interpolation process) into the final precision integer or floating-point number that will be compared and stored with the values in the depth storage buffer 124).

The resulting interpolated complementary depth value for a pixel is then compared by the visibility test and depth storage module 122 with the complementary depth value stored in the depth storage buffer 124 for the same location. Depending upon the convention used for the complementary depth values, if the current complementary depth value is greater than or less than the stored complementary depth value, the pixel is either visible or not. The result of the visibility test is provided to the color computation and storage module 126, which produces final color for each visible pixel using information provided by the polygon setup and rasterizer module, which is then stored in color storage buffer 128, for display upon display 130.

Other embodiments are within the scope of the claims. For example, one need not maintain a monotonic decrease of absolute depth value stored in the depth buffer with increase of the distance to the objects from the camera. If sign is stored in the depth buffer, it may be beneficial to compute stored Z as Zs−A, where A is a constant between 0 and 1. In this case, best precision in the floating-point format can be achieved in the middle of the depth range. This can be useful, for instance, if areas close to the near and far plane are blurred to emphasize "depth-of-field" effect. Any of the modules described with respect to FIG. 17 can be implemented in a variety of ways. For example, the functions of various modules can be combined with one another into any other number of modules. Each module can be implemented as a software program stored on a tangible memory (e.g., random access memory, read only memory, CD-ROM memory, hard disk drive) to be read by a central processing unit to implement the functions of the present invention. Or, the modules can comprise programming instructions transmitted to a general purpose computer or to graphics processing hardware via a transmission carrier wave. Also, the modules can be implemented as hardware logic circuitry implementing the functions encompassed by the present invention.

What is claimed:

1. A method for evaluating the depth of a pixel in a scene, the scene enclosed in a view volume, the scene to be rendered from a camera position, the view volume having a near and a far plane, comprising:

calculating a depth value for a pixel in the scene, the depth value being generated by a depth function of view distance within the view volume from the camera position; and storing the depth value in a floating-point format, the floating-point format including a mantissa and exponent, where, for a pixel within the view volume having the minimal non-zero distance to the far plane represented by a unique stored depth value, the depth value is stored as the smallest positive floating-point number representable by the floating-point format.

2. The method of claim 1 wherein, for a pixel at the far plane, the depth value is stored as 0 in the floating-point representation.

3. The method of claim 1 wherein, for a pixel within the view volume having the minimal non-zero distance to the near plane represented by a unique stored depth value, the depth value is stored as the second largest floating-point number representable by the floating-point format.

4. The method of claim 3 wherein, for a pixel at the near plane, the depth value is stored as the largest floating-point number representable by the floating-point format.

5. The method of claim 1 wherein the depth function, represented by Zs, comprises:

$$Zs = \frac{d}{f-d} * \left(\frac{f}{Zv} - A\right)$$

where d is the distance to a near plane of the view volume, f is the distance to a far plane of the view volume, Zv is the distance to a particular pixel in the view volume, and A is a constant.

6. The method of claim 5 wherein A is equal to 1.

7. The method of claim 6 wherein the depth function computes the depth value by subtracting a depth value interpolated per pixel from a constant value.

8. The method of claim 7 wherein the constant value is equal to the maximum depth value that can be stored in the floating-point format.

9. The method of claim 1 wherein the depth function computes the depth value by subtracting a constant value from the reciprocal of the view distance corresponding to the pixel.

10. The method of claim 9 wherein the constant value is equal to the reciprocal of the view distance from the camera to the far plane.

11. The method of claim 1 wherein the depth function computes the depth value by multiplying the view distance corresponding to the pixel by a scale factor, and subtracting a constant value.

12. The method of claim 11 wherein the constant value and scale factor are selected such that the depth function generates, for the near and far planes respectively, depth values that have, respectively, the maximum and minimum absolute magnitude that can be represented by the floating point format.

13. A method for evaluating the depth of a pixel in a scene, the scene enclosed in a view volume, the scene to be rendered from a camera position, the view volume having a near and a far plane, comprising:

calculating a depth value for a pixel in the scene, the depth value being generated by a depth function of view distance within the view volume from the camera position; and storing the depth value in a floating-point format, the floating-point format including a mantissa and exponent, where substantially the entire set of points of view distance, from the near to far plane in the view volume, is mapped by the depth function to substantially the entire set of floating-point numbers representable in the floating-point format.

14. The method of claim 13 wherein a pixel located at the near plane is mapped to the floating-point number with the maximum absolute magnitude representable in the floating-point format and a pixel located at the far plane is mapped to the floating-point number with the minimum absolute magnitude representable in the floating-point format.

15. The method of claim 13 wherein the pixel located at the near plane is mapped to the largest positive or to the largest negative floating-point value representable in the floating-point format and the pixel located at the far plane is mapped to 0 in the floating-point format.

16. A method for evaluating the depth of a pixel in a scene, the scene enclosed in a view volume, the scene to be rendered from a camera position, the view volume having a near and a far plane, comprising:

calculating one or more depth values for pixels in the scene, the depth values being generated by a piece-wise continuous function of distance within the view volume from the camera position; and storing the depth values as floating-point numbers in a depth buffer using a floating-point format, such that for at least one pixel inside the view volume at which the derivative of the depth value function over the distance within the view volume has the smallest absolute magnitude over the view volume, its depth value is stored using a floating-point number having the smallest absolute magnitude representable in the floating-point format.

17. An apparatus for evaluating the depth of a pixel in a scene, the scene enclosed in a view volume, the scene to be rendered from a camera position, the view volume having a near plane and a far plane, comprising:

a depth value calculation module configured to calculate a depth value for a pixel in a scene, the depth value being generated by a depth function of view distance within the view volume from the camera position; and a depth storage module configured to store the depth value in a depth value storage buffer using a floating-point format, the floating-point format including a mantissa and exponent, the depth value calculation module configured to calculate the depth value for the pixel such that, for a pixel within the view volume having the minimal non-zero distance from the far plane represented by a unique stored depth value, the depth value is stored as the smallest positive floating-point number representable by the floating-point format.

18. The apparatus of claim 17 wherein, for a pixel at the far plane, the depth value is stored as 0 in the floating-point format.

19. The apparatus of claim 17 wherein, for a pixel within the view volume having the minimal non-zero distance from the near plane represented by a unique stored depth value, the depth value is stored as the second largest floating-point number representable by the floating-point format.

20. The apparatus of claim 17 wherein, for a pixel at the near plane, the depth value is stored as the largest floating-point number representable by the floating-point format.

21. The apparatus of claim 17 wherein the depth function, represented by Zs, comprises:

$$Zs = \frac{d}{f-d} * \left(\frac{f}{Zv} - A\right)$$

where d is the distance to a near plane of the view volume, f is the distance to a far plane of the view volume, Zv is the distance to a particular pixel in the view volume, and A is a constant.

22. The apparatus of claim 21 wherein A is equal to 1.

* * * * *